Jan. 10, 1967 C. D. FOX 3,297,104
SPEED CONTROL DEVICE
Filed Nov. 27, 1964 3 Sheets-Sheet 2
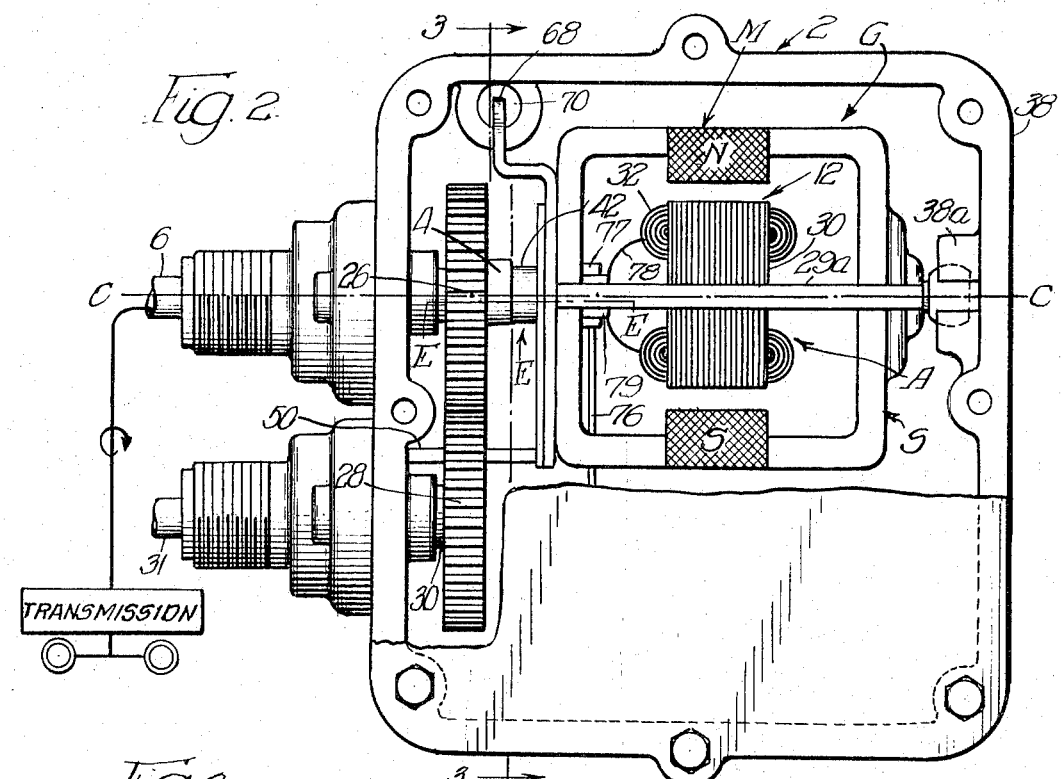
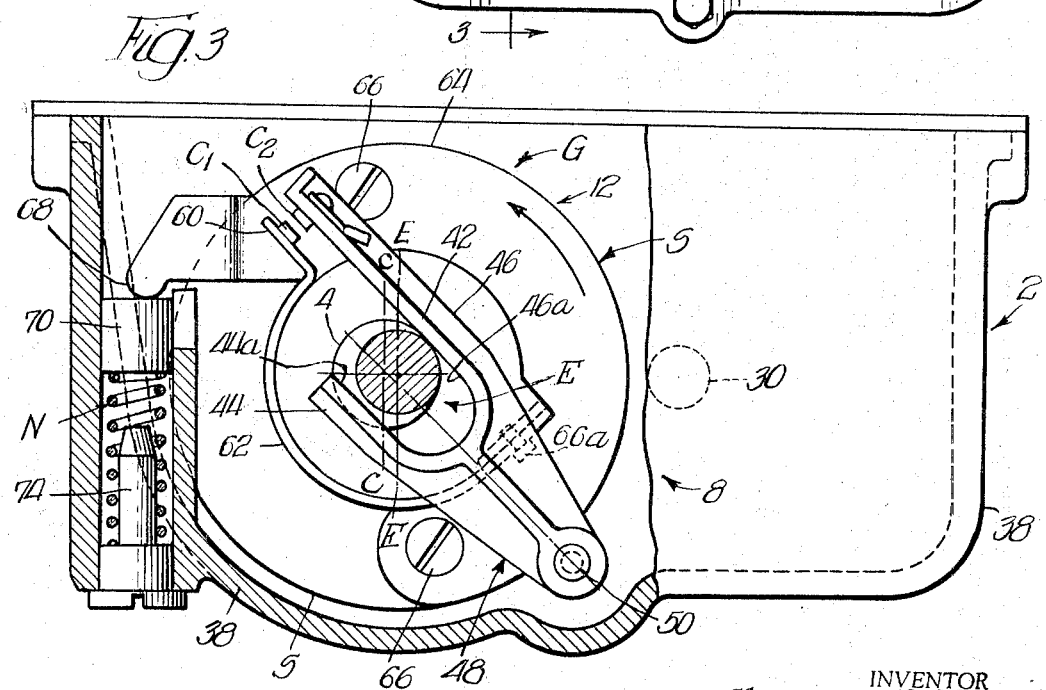
INVENTOR
Clarence D. Fox,
BY Richard J. Myers
ATTY

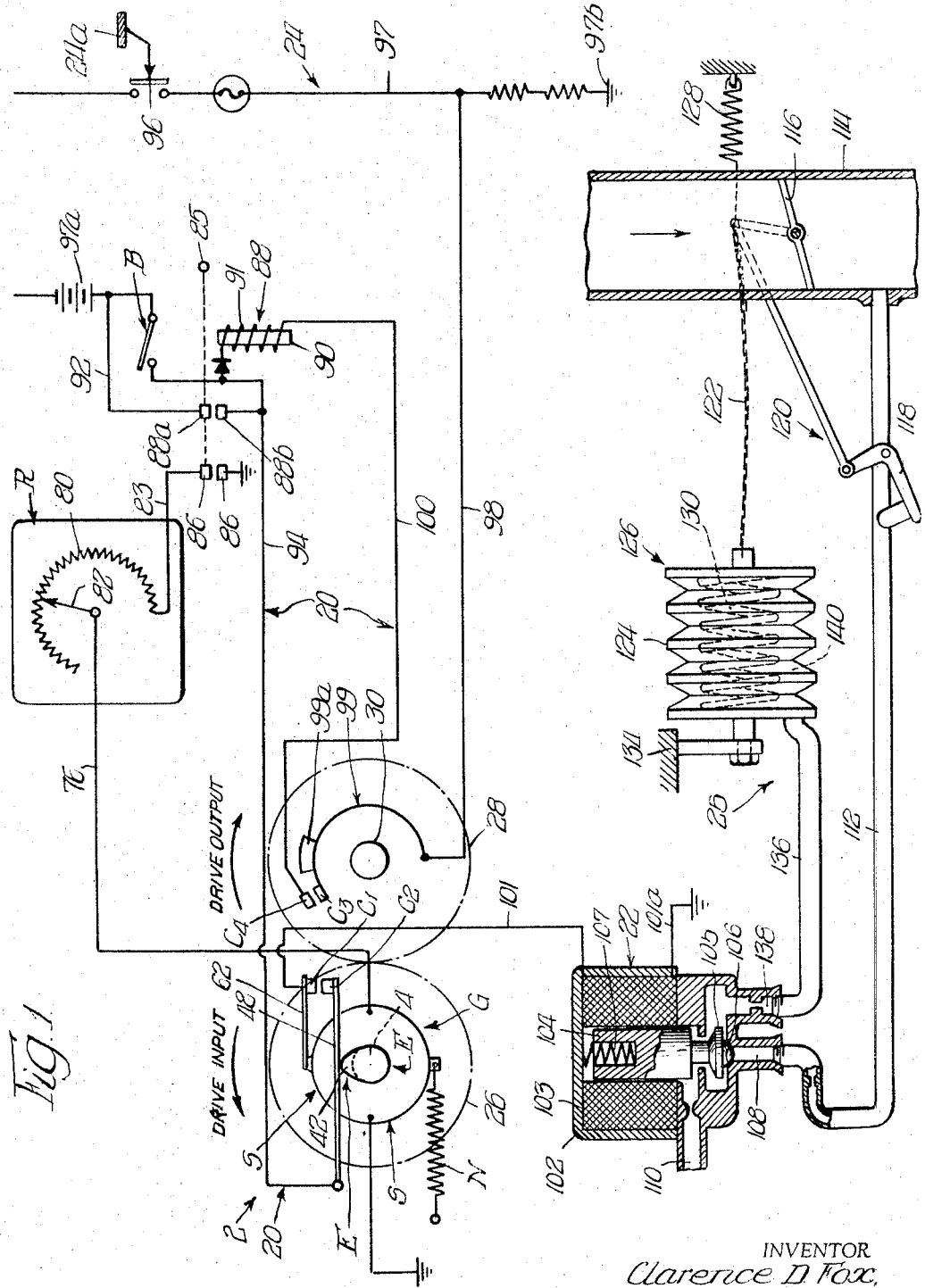

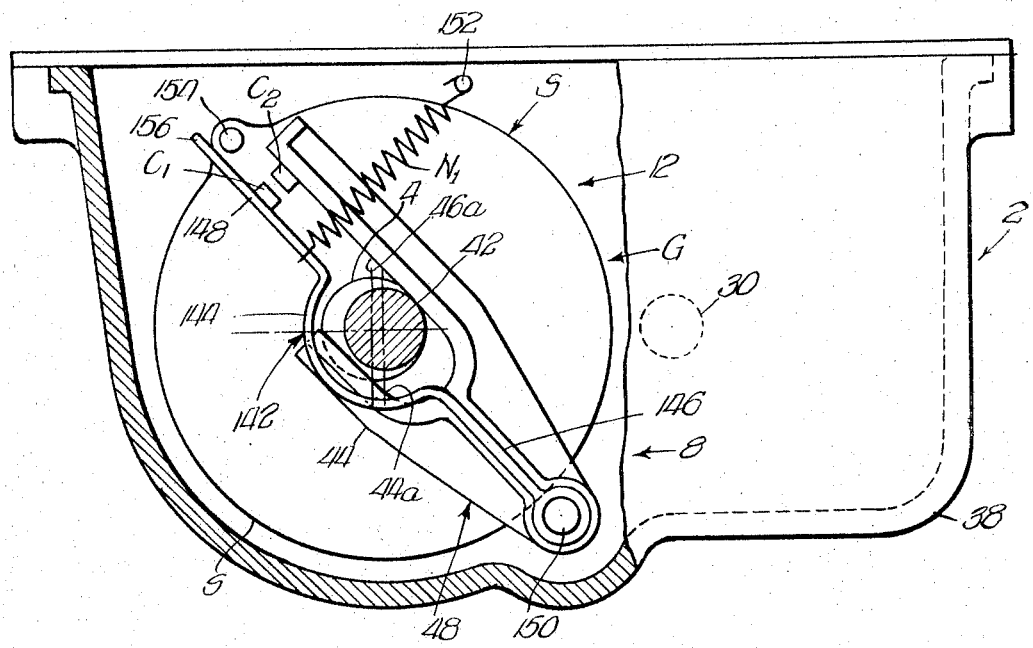
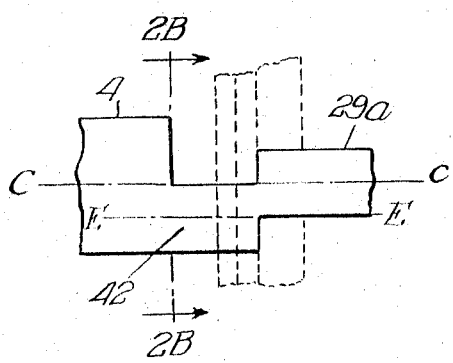
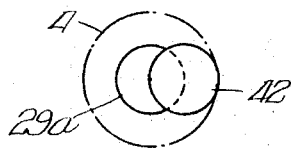
INVENTOR
Clarence D. Fox,
BY
Richard J. Myers

3,297,104
SPEED CONTROL DEVICE
Clarence D. Fox, Macon, Ill., assignor to Borg-Warner Corporation, Chicago, Ill., a corporation of Illinois
Filed Nov. 27, 1964, Ser. No. 414,124
13 Claims. (Cl. 180—82.1)

This invention relates to a speed control device and, in particular, a speed control device for maintaining the speed of a prime mover such as that for an automotive vehicle without requiring an operator to regulate the speed output of such a prime mover by the usual accelerator means.

There have been previously proposed devices or mechanisms for controlling and maintaining a manually selected speed of a prime mover such as that for a vehicle of the automotive type or the like, without requiring the operator to control such speed by constant operation of the usual vehicle accelerator pedal. Most of the systems have been relatively complicated in structure, resulting in a high initial cost and high maintenance expense due to the complexity and the sensitivity of such previously available systems.

It is, therefore, a general object of this invention to provide an economically and commercially practicable improved automatic speed control device that is relatively simple in its structure and automatic in its operation.

Another object of this invention is to provide an improved speed control device that is effective to automatically assume control of the fuel delivery to a prime mover of a vehicle after the vehicle has been accelerated to a predetermined speed setting.

Another object of this invention is to provide a device of the present type that incorporates improved means for adjustment effective to sense changes in load conditions and prevent under-speed and over-speed conditions of the prime mover and which is effective to make corrections for bringing the prime mover to a pre-set output speed.

It is still a more detailed object of this invention to provide an improved speed control device which includes means forming an electrical generator adapted to be driven by the speedometer cable. This generator is particularly characterized by having an arcuately movable reaction stator effective to operate a uniquely arranged control switch, rheostat means are arranged to be selectively set in accordance with the chosen vehicle speed for regulating the current delivered by the generator as a function of the vehicle speed-setting to effect the operation of the control switch when the selected speed has been reached to in turn control the fuel delivery of the prime mover.

Still another object of this invention is to provide an improved speed control or selectable speed maintaining device provided with a pair of electrical contacts operable in accordance with vehicle sensing means and controlled by a speed selector rheostat means whereby the electrical generating means provides arcuate motion for imparting relative movement to the electrical contacts toward and away from one another and completing the electrical circuit and opening the circuit against the action of a spring biasing means.

These and other objectives of the invention will become more readily apparent from reference to the following description and appended drawings to wit:

FIGURE 1 is a schematic view of the invention;

FIGURE 2 is a view partly in section of the invention illustrating the electrical generator and torque reaction sensing means forming an essential part of the unique governor;

FIGURES 2a and 2b are enlarged sectional views of the eccentric cam means shown in FIGURE 2;

FIGURE 3 is a sectional view taken substantially along line 3—3 of FIGURE 2;

FIGURE 4 is a sectional view of a modification of the form of the invention shown in FIGURE 3.

In the basic essentials, the present invention comprises means for maintaining the speed of a vehicle at a manually pre-selected value irrespective of the variations in the surface grade over which the vehicle is being driven. In the present preferred embodiment, an electrical current generator G is employed and driven from the speedometer cable to thus generate a current which is a function of the speed of the vehicle. The rotating armature A (FIG. 2) of the generator moves in the field of a permanent magnet M of an arcuately movable stator S and develops an opposing magnetic field with a resultant electric current being generated that is regulated by a manually adjustable rheostat R by which the value of the current supplied is predetermined and which settings of the rheostat are correlated to the various speeds of the vehicle which speeds are to be selectively maintained. Hence, the reaction of the stator S of the generator G will be a direct function of the speed of rotation of the generator driven in the present instance by the speedometer cable and of the setting of the rheostat R. The stator S of the generator G is made to be arcuately adjustable against the resistance of a biasing spring B and will reflect in its reaction the intensity of the magnetic field produced by the current passing through the armature A and the rate of rotation of the armature. By opening and closing a pair of control contacts C1 and C2, one of which is operated by the arcuately adjustable stator, there is thus provided means for accurately sensing when the vehicle has reached a predetermined selected speed. It then becomes a simple matter to employ the opening and closing of these contacts C1 and C2 to automatically control the delivery of fuel to the prime mover. This is accomplished in the present embodiment by having the generator-operated contacts remain closed below the selected speed causing the fuel delivery means to be maintained open until the predetermined selected speed has been reached, whereupon the opening of the contacts by the reaction movement of the stator S becomes effective to reduce the delivery of fuel to the prime mover until and when the speed of the vehicle drops below said selected value.

While these basic essentials are comprehended in the broader scope of the present invention, it will be understood that in its more specific aspects the invention comprehends certain additional and important features. One of these more refined features is the provision of a modulating means E for adjusting the position of one of the generator contacts with reference to the other contact at a frequency corresponding to the speed of rotation of the armature A which assures added smoothness to the operation of the fuel delivery means as will appear. Still another more specific aspect of the invention is the provision of a centrifugally operated switch means having contacts C3, C4 effective to maintain the control circuit to the speed maintaining means open until a predetermined minimum vehicle speed such for example as, 25 m.p.h. has been reached, following which a manual button B can become effective to activate the speed maintaining system.

A further and more specific feature of this invention is the provision of a speed control device as aforesaid, that is operable upon exceeding a predetermined vehicle speed through the operation of an electrical circuit provided with a manually actuated relay means and a unidirectional current flow means preventing a reverse current flow that would otherwise leave the relay means in the closed circuit position when it is desired to terminate the operation of the speed control device, all of which will be described in detail hereinafter.

Referring now, in greater detail, to the figures of the drawing, and more particularly to FIGURES 1–3, the present improved speed control or manually selectable automatic speed maintaining device is indicated generally at 2 and essentially includes an input shaft or drive means 4 adapted to be connected in driving relation with a speedometer cable 6 leading to the usual drive line transmission, and thence to the vehicle driven wheels, indicated schematically in FIGURE 2. The speed control device 2 comprises essentially the electrical current generator G and associated manually adjustable rheostat R. The generator G includes a reaction stator S effective to make and break a speed control circuit indicated generally at 20, which includes a solenoid valve 22 for controlling an atmospheric engine manifold pressure supply means 25. The circuit 20 is connected with a brake circuit 24 to provide a safety interlock therewith.

The drive shaft 4 is connected through gear 26 meshing with a gear 28 mounted on output shaft 30 in turn connected with cable or like means 31 extending to the vehicle speedometer-odometer instrument panel (not shown). The input shaft 4 is connected in driving relation with armature A, having an electrical core and electric winding 32 thereabout. The rotation of the armature A causes winding 32 to cut across the lines of the magnetic field of permanent magnet M forming part of the generator G. The generator magnet acts upon the armature A to induce an opposing electromagnetic field and an electric current in the winding 32. The permanent magnet M is mounted in the reaction stator means S which is in the form of a housing or casing surrounding the armature A. The reaction housing S is journalled for limited arcuate movement on armature shaft 29a which is connected with input shaft 4, which shaft is rotatively journalled in bearing 38a of the outside casing 38. The effect of the opposing magnetic fields is to cause arcuate movement or partial rotation of the stator S in the direction of rotation of the shaft 4 and armature A. The input and output shafts 4, 30 are rotatively journalled in fixed outer housing 38 and the gears 26, 28 and stator S and rotor elements A are enclosed in the housing 38 which may be attached to the vehicle instrument panel (not shown).

In the more specific aspect of the present invention means is provided for oscillating contact C2 relative to C1 at a rate related to the r.p.m. of input shaft 4, which has been found to improve the smoothness of the operation of the manifold pressure supply means 25 and thus in turn operate the engine more smoothly than were contact C2 maintained stationary.

Eccentric or wobble means E includes a cam 42 driven by the input shaft 4. Referring to FIGS. 2 and 2a, the central axis of rotation of the shafts 4 and 29a lie along line C—C whereas the central axis of the cam element 42 lies along line E—E to establish eccentricity of the cam 42 upon rotating of shaft 4. The cam 42 engages the arms 44 and 46 alternately of the yoke element or contact member 48 which is pivotally connected by pin 50 to the housing 38. The cam element 42 engaging the inner sides 44a and 46a of the arms 44 and 46 respectively causes the yoke element 48 to develop a small amplitude and oscillate back and forth about the pivot pin 50 and carries contact C2 of arm 46 toward and away from the contact C1. The radially extending end portion 60 of an arcuately-shaped arm 62 carries the contact C1. The arm 62 is fastened to the crescent-shaped arm 64 by screws 66a. The arm 64 has a terminal 68, contacting piston 70 urged against the terminal 68 by braking spring N, held by retainer 74 mounted in the housing 38 by screws 66. The arm 64 is fastened to the housing or stator S. The reaction means S, the cam element 42 and the contact arms 48 and 62 are shown schematically in FIG. 1.

The rheostat means R has an electrical connection with the winding 32 of the electrical rotor A by way of wire 76, brushes 77, commutator 79, and wire 78. The rheostat R includes a variable ohmic resistor element 80 for controlling the value of current delivery and hence the electrical magnetic intensity of the field developed by the rotation of the rotor core 32. The resistor element 80 has an indicator arm 82 operable with reference to indicia in the form of miles per hour placed on suitable dial marked m.p.h. to correlate vehicular speed of the setting of the arm 82 with corersponding values of resistance. The rheostat resistance element 80 is connected by ground wire 83 to a pair of contacts 86, 86 operable to open and closed circuit positions by vehicle ignition switch 85.

The electrical circuit 20 is additionally provided with an electrical relay means 88 which includes an electromagnetic core 90 and winding 91 thereabout and a set of relay points 88a and 88b. The points or contacts 88a, 88b are placed in open and closed circuit positions by the operation of ignition switch 85. Electric wire 92 connects the relay means with the vehicle battery 97a A manually operable button B in wire 94 of circuit 20 has an open and a closed position and in the closed position energizes the relay means 88 to condition circuit 20 for being closed upon the vehicle attaining a pre-selected minimum speed. A uni-directional current flow means in the form of a diode between line 4 and relay means 88 allows current to flow to the relay means but prevents current flow in reverse direction from the relay means to wire 94, which in turn connects with contact C2.

The brake circuit 24 containing the usual signal light is completed by depressing the brake pedal 24a to operate brake switch 96. This circuit includes wire 97 going from a source of electrical power, which in this instance is the battery 97a, to ground 97b, and a wire 98 connecting circuits 24 and 20 through centrifugal switch means 99. The switch means 99 includes the pair of electrical contact points C3, C4 and a centrifugal weight 99a, as shown schematically in FIG. 1, whereby the centrifugal weight 99a is connected with and operated in response to the acceleration of the vehicle and allows the contact C3 to engage contact C4, thus completing the electrical circuit 20 connecting line 98 with line 100, thereby conditioning relay 88 for operation. Line 101 contacts contact C1 with solenoid 22 having ground wire 101a. The completing of this part of the circuit through the centrifugal switch is arranged to occur at any selected speed, such as 25 m.p.h.

The solenoid valve means 22 comprises a valve housing 102 in which is disposed an electromagnetic solenoid 103 for raising a plunger 104 having a valve head 105 urged to seat 106 by spring 107. Engine manifold vacuum pressure, i.e., a pressure below atmospheric pressure that exists within the engine manifold, is admitted into the valve housing passage 108. Line 110 admits the atmosphere to the solenoid means 22, conduit 112 connects the passage 108 with the engine manifold line 114 below the butterfly valve 116 which constitutes the engine throttle means. The throttle means or butterfly valve 116 is connected with the vehicle accelerator pedal 118 by a suitable linkage 120. A chain 122 connects linkage 120 with bellows portion 124 of a bellows servomotor 126, the butterfly valve 116 being urged to a closed position by a spring 128. The servomotor unit includes a spring 130 that urges the bellows to an extended position. The servomotor 126 is connected through chain 122 with linkage 120 on one side and on the other side with support 134. A passage 136 communicates between the valve housing outlet 138 and the inlet of the chamber 140 of the bellows portion of the servomotor.

*Operation*

As the vehicular road speed is increased, the speedometer cable causes rotation of the input shaft 4 and armature A whereby an electrical current is generated through the magnetic field of the winding of the rotor or armature A crossing the field of the permanent magnet M. This causes the stator S to rotate in the same direction as the rotation of the input shaft 4 (see arrows FIGURES 1, 2 and 3). The intensity of the field developed and therefore the torque delivered to the reaction housing or stator S is determined by the setting of the rheostat R. The greater the electrical resistance of the rheostat—depending upon the speed setting—the greater the speed required to generate the value of electrical current flow through the selected resistance of the rheostat for operation of the solenoid value 22.

Now with reference to FIGURE 3 it will be seen that the generator arm 64 is normally urged by the spring 72 to place the first contact C1 into engagement with the second contact C2. The reaction torque causing the arcuate movement of partial rotation of the stator S through the influence of the magnetic field tends to rotate the stator or housing S and the arm 64 in a counterclockwise direction, thus overcoming the opposing action of spring N to thus cause the contact C1 to separate from contact C2. Upon increase of the road load of the vehicle upon encountering an increased grade, the angular velocity of the speedometer shaft 4 will decrease and therefore the torque delivered to the generator reaction housing S will decrease and the spring N will force the arm 68 of the generator reaction housing S clockwise causing contacts C1 and C2 into contact, completing circuit 20 and again energizing solenoid valve 22 producing an increase in engine speed. The rheostat unit 12 through its ohmic resistance value setting corresponding to the selected speed determines the intensity of the magnetic field and therefore the torque applied to the generator housing. The greater the resistance setting of rheostat R, the lesser the tendency of reaction housing S to rotate against the spring N for a given speed. The ohmic resistance setting is proportional to the speed of the vehicle to be maintained. At high ohmic resistance values, say at 90 m.p.h. speedometer reading, the resistances are correspondingly high and therefore the ability of the generator reaction housing to rotate is correspondingly limited and the more effective the spring tending to maintain contacts C1 and C2 closed, and cause the engine to operate at higher speeds. At lower ohmic resistance values, the reverse is true, i.e., the torque of the generator housing opposing the force of the housing spring is obtained at a lower rotational speed so that the engine operates at a correspondingly lower speed.

Only at speeds in excess of 20–25 m.p.h. will the rotation of the output shaft cause the centrifugal switch means C3 and C4 to complete the circuit 20. The manually operated button 85 may then be depressed to complete the circuit and cause the relay unit 88 to maintain the contacts C1 and C2 in the closed portion. This condition energizes the solenoid means 22 to retract plunger 104 and the solenoid valve 105 blocks communication between the atmospheric line 110 and the line 136 leading to the diaphragm unit 126 and permits manifold vacuum pressure to be admitted to the servo motor unit 126 allowing the bellows 124 to contract and pull on the chain 122 to open the throttle or butterfly valve 116 to the atmosphere, resulting in an increase in engine speed. When the contacts C1 and C2 are opened the solenoid valve becomes deenergized (see FIG. 1) so that the atmosphere is allowed to communicate with the diaphragm and the manifold pressure is blocked from the diaphragm unit 126 so that the diaphragm unit is allowed to expand, causing a relaxing of the pull through chain 122 and allowing the spring 128 to close the butterfly valve 116 with a resulting decrease in engine speed.

It will thus be seen that depending upon the desired speed as determined by the setting of the rheostat unit 14 readable in miles per hour the desired output speed will be maintained. Should the output speed decrease, the contacts C1 and C2 will complete the circuit 20 and the throttle means 116 will be opened to increase the engine speed. Whereas, when the output speed increases beyond the selected value the contacts C1 and C2 will seperate, opening the circuit 20 with the result that the thottle valve is closed and the engine speed thus decreased.

Modulating means introducing a predetermined frequency in the positioning of contacts C2 for engagement with contact C1 is provided in the form of the eccentric cam element 42 (FIG. 2a) which is slightly off center from the central axis C—C of the input shaft 4 causing the contact C2 to oscilliate, resulting in a gradual net circuit opening or circuit closing effect in the operation of the contacts C1 and C2. This results in a smoother gradual transition of engine speed changes and eliminates jerking or hunting of the engine in response to increase or decrease of road loads thereon as when grade changes are encountered.

The modulating means controls the effective strength and duration of the control signals delivered to solenoid valve 22 within a range of ±3 m.p.h. to prevent hunting. When energizing the system below the set speed, the energy transferred from the armature A is not sufficient to arcuately move the reaction member S against the spring 72, thereby maintaining the contacts C1 and C2 closed. When the vehicle speed reaches 3 m.p.h in excess of the predetermined or reference speed, the reaction member exerts sufficient force to separate contact C1 from contact C2 against the action of the spring 72 momentarily, interrupting the current supplied to the solenoid means 22 venting the servo motor 126 to atmosphere when off and to vacuum when the contacts are momentarily closed. The ratio of off to on times determines the amount of vacuum transmitted to the diaphragm unit or servomotor 126.

The brake light switch provides a safety measure. If it is desired to go off the automatic speed control, i.e., remove the speed control device from normal driving, one merely has to depress the brake pedal of the vehicle which completes the brake light circuit 24 and the brake light goes on. At the same time the brake light circuit delivers a countering voltage to the relay means 88 by way of line 97 which is thus deenergized by the voltage applied through line 92, since there now exists no potential difference across the relay means 88 and the circuit 20 is thus opened. The circuit 20 can be closed again only by depression of the manual button B subsequent to the release of the brake pedal 24a.

FIG. 4 illustrates a modified form of means for operating the contacts C1 and C2, also described in connection with FIGURES 1 through 3 and the same reference characters are used in this modified form where the structures correspond. Referring now to FIG. 4, there is shown a yoke or bifurcated element 48 pivoted on the pin 150 and carrying an electrical contact C2. Further, there is provided an arm 142 that is also mounted on the pin 50 and has an arcuate portion 144 extending partially around the cam element 42 between a portion 146 connected to the pin 150 and a free end portion 148 carrying the usual electrical contact C1. The spring $N_1$ has one terminal connected to the housing 38 by pin 152 and the other terminal connected with the free end 148 for urging contact C1 into engagement with contact C2. The reaction housing S is provided at its outer periphery with a pin 154 for engaging with the tip 156 of the arm 142. The pin 154 when rotating in a counterclockwise direction, will cause separation of the contacts C1 and C2 against the action of the spring N.

While contacts C3 and C4 are shown and described as being operated by centrifugally responsive weight means, it will be apparent that other means, such as an electromagnet, could be employed to operate these contacts as a function of speed in any well known manner.

While only certain preferred embodiments of the invention have been described and illustrated, it is apparent that other modifications and alterations may be made therein. It is therefore intended in the appended claims to cover all such modifications and alterations as may fall within the true spirit and scope of the invention consistent with the state of the prior art.

It will be appreciated that the electrical circuit 20 and the electrical contacts C1 and C2, and the solenoid valve 22 may be replaced by any suitable mechanical linkage connecting the stator S with a pneumatic valve for selectively venting atmosphere pressure and manifold vacuum pressure to the servomotor 26. However, the preferred form is to employ the contacts C1 and C2 as shown by the present disclosure, since in the more specific aspects of the present invention it has been found that unusually satisfactory results are obtained by this construction.

It will also be appreciated that the spring N may be replaced by an electrical power means such as a battery source connected with the lead 83 (rather than having the lead 83 go to ground, as shown) whereby the battery would supply a counter electromotive force opposing the voltage generated by the generator G. However, the preferred form is to employ the spring N as shown by the present disclosure, since in the more specific aspects of the present invention it has been found that unusually satisfactory results are obtained by this construction.

What is claimed is:

1. In an automatically operable, manually selectable, speed maintaining device particularly adapted for the prime mover of a ground vehicle, said device including means for sensing the ground speed of the vehicle, means including an armature arranged to be driven by said speed sensing means effective to generate a varying magnetic field in proportion to said speed, a magnet reaction means automatically arcuately movable in proportion to the intensity of said magnetic field, electrical contact means, a means defining a control circuit containing said contact means, said reaction means being operably responsive to a predetermined valve of said magnetic field effective to operate said contact means, resistance means in said circuit for regulating the value of the current delivered to said armature as a function of the desired vehicle speed to be maintained and hence the intensity of said magnetic field correspondingly determining the extent of arcuate movement of said reaction means in relation to a predetermined vehicle speed, said resistance means providing a resistance to the current flow to said armature and hence the intensity of said magnetic field generated, and means in said circuit to regulate the fuel delivery to said prime mover, said contact means being operative in open and closed positions of said contacts to increase and decrease the vehicle speed.

2. In an automatically operable, manually selectable, speed maintaining device particularly adapted for the prime mover of a ground vehicle, said device including means for sensing the ground speed of the vehicle, means including an armature arranged to be driven by said speed sensing means effective to generate a varying magnetic field in proportion to said speed, magnetically conductive means automatically arcuately movable in proportion to the intensity of said magnetic field, electrical contact means, a means defining a control circuit containing said contact means, said magnetically conductive means being operably responsive to a predetermined value of said magnetic field effective to operate said contact means, manually adjustable resistance means in said circuit for regulating the value of the current delivered to said armature as a function of the desired vehicle speed to be maintained and hence the intensity of said magnetic field correspondingly determining the extent of arcuate movement of said magnetically conductive means in relation to a predetermined vehicle speed, said resistance means providing a resistance to the current flow to said armature and hence the intensity of said magnetic field generated, and means in said circuit to regulate the fuel delivery to said prime mover, said contact means being operative in open and closed position of said contacts to increase and decrease the vehicle speed.

3. In an automatically operable, manually selectable, speed maintaining device particularly adapted for the prime mover of a ground vehicle, said device including means for sensing the ground speed of the vehicle, means including an armature arranged to be driven by said speed sensing means effective to generate a varying magnetic field in proportion to said speed, a magnet reaction means automatically arcuately movable in proportion to the intensity of said magnetic field, means for increasing and decreasing the supply of fuel to the prime mover for increasing and decreasing the speed of the vehicle, said reaction means being operably responsive to a predetermined value of said magnetic field effective to operate said means for increasing and decreasing of the fuel, resistance means in said circuit for regulating the value of the current delivered to said armature as a function of the desired vehicle speed to be maintained and hence the intensity of said magnetic field correspondingly determining the extent of arcuate movement of said magnetically conductive means in relation to a predetermined vehicle speed to increase and decrease the vehicle speed.

4. In a manually selectable automatically operable vehicle speed maintaining device adapted for a prime mover having a servomotor operated means for adjustably feeding fuel thereto, vehicle speed sensing means, means in combination with said fuel feeding means and said speed sensing means effective to adjust the rate of fuel delivery to said prime mover for maintaining a selected constant speed of said vehicle irrespective of variations in the grade of the surface over which the said vehicle is being driven, said last named means including means defining an electrical field generator having an armature adapted to be driven by said speed sensing means, and a reaction stator, the latter being arranged for limited arcuate movement, means opposedly adjusting the torque reaction of said arcuately adjustable stator in proportion to the intensity of the field generated by said generator, means defining a pair of electrical contacts, one of which is movable with reference to the other in response to the arcuate adjustment of said stator against the said action of said means opposedly for operating said contacts in response to the generation of a predetermined field intensity by said generator, manually selectable speed setting means comprising an electrical resistance means having a plurality of settings corresponding to respective selectable speeds to be maintained constant, circuit defining means placing the armature of said generator and said rheostat in series relation, current supply defining means for supplying current to said resistance means whereby when said selected speed has been reached, said generator will produce a torque reaction on said stator of a magnitude to cause an opening of said contacts, means for automatically operating said servomotor including a solenoid valve effective to selectively deliver manifold vacuum or atmospheric pressure to said adjustable fuel delivery servomotor means and to effect either opening or closing of said valve, and means defining a control circuit for said solenoid under the control of said generator stator reaction operated contacts.

5. In a device for automatically maintaining a manually selected speed of a vehicle driven by an internal combustion engine and comprising, means effective to produce a rotating magnetic field having an intensity corresponding to said manually selected vehicle speed, magnetically responsive torque reaction means positioned for movement under the influence of said rotating magnetic field, means yieldably resisting said movement, an electrical circuit comprising a pair of electrical contacts, means biasing one of said contacts with respect to the other, means driven by said magnetically reactive means effective to move one of said contacts against said biasing means and with respect to the other contact upon the occurrence of a predetermined torque reaction in said magnetically responsive torque reaction means, speed regulating means in the form of a manually settable resistance means having values representing given vehicle speeds and in electrical connection with said first mentioned means, servomotor means, said electrical circuit comprising a solenoid valve selectively supplying engine manifold and atmosphere pressures to said servomotor during open and closed circuit positions, engine throttle means, and linkage connecting the servomotor means with the throttle means whereby said throttle means is opened and closed by the solenoid means.

6. A speed control device for a vehicle having a prime mover, said device comprising speed sensing means on the vehicle, means for producing a magnetic field moving at a rate which is related to the rate of movement of the speed sensing means and operatively connected therewith, magnetically conductive means positioned for movement under the influence of said moving magnetic field, an electrical circuit having a pair of electrical contacts, means opposing the movement of said magnetically conductive means for positioning one of said contacts with respect to the other, means carried by said magnetically conductive means and operable to oppose the positioning of said one contact, manually adjustable means for regulating the level of the magnetic field to thereby correspondingly regulate the extent of the movement of said magnetically conductive means in accordance with a desired vehicle speed and electrically connected with said means for producing a magnetic field, and means in said circuit regulating the fuel delivery to said prime mover and operative to increase and decrease the vehicle speed.

7. In an automatic, manually selectable speed maintaining control device adapted for a vehicle including a prime mover, rotatable vehicle speed sensing means, an electric means effective to produce a rotating magnetic field as a function of the rate of rotation of said speed sensing means and adapted to be drivingly connected therewith, torque reactive magnetic means responsive to said rotating magnetic field, including means defining an electrical circuit having a pair of electrical contacts therein, said torque reactive means being effective to operate one of said contacts from closed to open circuit, manually adjustable means for regulating the intensity of said magnetic field to thereby correspondingly regulate the extent of arcuate movement of said magnetically reactive means in accordance with a predetermined vehicle speed and electrically connected with said means for producing said magnetic field, said manually adjustable means being related to a selected set speed control providing a resistance to said electric means for in turn producing an adjustable magnetic field, and means in said circuit adapted to regulate the fuel delivery to said prime mover, said means being operative to increase and to decrease the vehicle speed.

8. In an automatic, manually selectable speed maintaining control device adapted for a vehicle including a prime mover, rotatable vehicle speed sensing means, an electric means effective to produce a rotating magnetic field as a function of the rate of rotation of said speed sensing means and adapted to be drivingly connected therewith, torque reactive magnetic means responsive to said rotating magnetic field, including means defining an electrical circuit having a pair of electric contacts therein, said torque reactive means being effective to operate one of said contacts between open and closed circuit positions, manually adjustable means for regulating the intensity of said magnetic field to thereby correspondingly regulate the extent of arcuate movement of said magnetically reactive means in accordance with a predetermined vehicle speed and electrically connected with said means for producing said magnetic field, said manually adjustable means being related to a selected set speed control providing a resistance to the current produced by said electric means for in turn producing an adjustable magnetic field, and means in said circuit adapted to regulate the fuel delivery to said prime mover, said means being operative to increase and decrease the vehicle speed.

9. The invention according to claim 8 wherein said electrical circuit is provided with an electrical valve means arranged to be alternatively placed in operative connection with engine manifold pressure and atmospheric pressure, a pressure responsive servomotor, an engine throttle means operatively connected with said servomotor and with an accelerator and movable in accordance therewith, whereby atmospheric pressure and manifold pressure is selectively communicated past the solenoid valve to the servomotor to operate the throttle means.

10. The invention according to claim 8 wherein said electrical circuit comprises a relay means including an electrical valve means and manually operated switch having a closed circuit position for energizing said valve means, and contact means energized by said valve means for operating the electrical circuit.

11. An electrically operated speed control device for adjustable controlling the speed of operation of a prime mover, said device comprising speed sensing means, means for producing a magnetic field moving at a rate which is related to the movement of the speed sensing means and operatively connected therewith, magnetically conductive torque reaction responsive means positioned for limited movement under the influence of said moving magnetic field, an electrical circuit having a pair of electrical contacts, means for moving one of said contacts relative to the other in one direction, means carried by said magnetically conductive reaction means and operable to move one of said contacts in the opposite direction of said one contact, adjustable means for regulating the level of the magnetic field and thereby correspondingly regulate the extent of the movement of said magnetically conductive means in accordance with a desired speed and electrically connected with said means for producing said magnetic field, and means in said circuit regulating the fuel delivery to said prime mover and operative by said contacts to increase and decrease the speed of the prime mover.

12. An electrical speed control device for selectively controlling the speed of operation of a prime mover adapted to be driven by a vehicle speed sensing means, said device comprising an electric generator means having a rotor element in driving connection with said speed sensing means and having a torque reaction magnet stator circumscribing said rotor, said rotor having an electrical winding effective to produce a magnetic field for inducing a reaction in the field of said magnet stator for causing limited rotation of said stator, current adjusting means electrically connected with said rotor providing a resistance adjustable in accordance with a desired selected prime mover speed for controlling the degree of rotation of the rotatable stator, an electrical circuit having a pair of electrical contacts, biasing means urging one of said contacts in one direction relative to the other contact for circuit operation, abutment means carried by said rotatable member and operable to move one of said contacts in the opposite direction relative to the other contact for circuit operation, in an arcuate path determined by the setting of said current adjusting means regulating the intensity of the magnetic field in accordance with a desired prime mover speed, and means in said circuit regulating the fuel supply to said prime mover and operative by the contacts to increase and decrease in the speed of the prime mover.

13. The invention according to claim 12 wherein said respective contacts having supporting means movable about a common pivot independent of the rotatable stator and pivotal toward and away from one another, said biasing means for said one contact including spring means urging said one contact relative to the other said contact, said rotatable stator being provided with an extension engageable with said first contact effective to move it in opposition to said spring means.

References Cited by the Examiner

UNITED STATES PATENTS

| | | | |
|---|---|---|---|
| 2,181,429 | 11/1939 | Hansen | 180—82.1 |
| 2,643,871 | 6/1953 | Warrick | 73—540 |
| 2,920,154 | 1/1960 | Allen | 200—61.46 X |
| 3,062,312 | 11/1962 | Dietrich et al. | 180—82.1 |
| 3,088,538 | 5/1963 | Brennan et al. | 123—102 X |
| 3,216,522 | 11/1965 | Cassano | 180—82.1 |

KENNETH H. BETTS, *Primary Examiner.*

UNITED STATES PATENT OFFICE
CERTIFICATE OF CORRECTION

Patent No. 3,297,104            January 10, 1967

Clarence D. Fox

It is certified that error appears in the above identified patent and that said Letters Patent are hereby corrected as shown below:

Column 7, line 50, "valve" should read -- value --.

Signed and sealed this 2nd day of September 1969.

(SEAL)
Attest:

Edward M. Fletcher, Jr.

Attesting Officer

WILLIAM E. SCHUYLER, JR.

Commissioner of Patents